United States Patent [19]

Baney et al.

[11] 4,243,721

[45] Jan. 6, 1981

[54] FLEXIBLE COATING RESINS FROM SILOXANE RESINS HAVING A VERY LOW DEGREE OF ORGANIC SUBSTITUTION

[75] Inventors: Ronald H. Baney, Midland; Len A. Harris, Rhodes, both of Mich.

[73] Assignee: Dow Corning Corporation, Midland, Mich.

[21] Appl. No.: 24,638

[22] Filed: Mar. 28, 1979

Related U.S. Application Data

[60] Division of Ser. No. 903,467, May 8, 1978, Pat. No. 4,197,230, which is a continuation-in-part of Ser. No. 863,970, Dec. 23, 1977, abandoned.

[51] Int. Cl.$^3$ .......................... B32B 27/36; G03B 1/00
[52] U.S. Cl. .................................... 428/412; 351/166; 428/446; 428/447; 428/450; 428/458; 428/461

[58] Field of Search ............... 428/412, 450, 458, 461, 428/446, 447; 351/166; 260/29.2 M

[56] References Cited

U.S. PATENT DOCUMENTS

| 3,640,778 | 2/1972 | Winfree et al. | 428/450 |
|---|---|---|---|
| 3,781,251 | 12/1973 | Hermes | 351/166 |
| 3,821,071 | 6/1974 | Dietzel et al. | 428/412 |
| 3,922,443 | 11/1975 | Brown et al. | 428/450 |
| 3,986,997 | 10/1976 | Clark | 260/29.2 M |

Primary Examiner—J. Ziegler
Attorney, Agent, or Firm—Robert L. McKellar

[57] ABSTRACT

Abrasion resistant siloxane resins having a low degree of organic substitution thereby tending to be brittle can be made flexible by including some degree of phenyl substitution into the organic substitution.

12 Claims, No Drawings

FLEXIBLE COATING RESINS FROM SILOXANE RESINS HAVING A VERY LOW DEGREE OF ORGANIC SUBSTITUTION

This application is a divisional application of Ser. No. 903,467, filed May 8, 1978, U.S. Pat. No. 4,107,230 which is a continuation-in-part of application Ser. No. 863,970, filed Dec. 23, 1977, now abandoned.

BACKGROUND OF THE INVENTION

This application is a continuation-in-part of application Ser. No. 863,970, filed Dec. 23, 1977 now abandoned.

The availability of lightweight plastics has led to the replacement of glass by such plastics for numerous uses. Over the past several years, new plastics have been developed which find use in window glazing, lenses, clear face shields, aircraft canopies and the like. Although such plastics have many outstanding properties, they are deficient in their resistance to scratching. An outstanding example is the deterioration of plastic sunglass lenses by common everyday use because such glasses are frequently removed from the face and laid on hard substrates, lens down.

Thus, in order to better utilize the advantageous properties of today's plastics, there is a need to render such plastics scratch and abrasion resistant.

In order to obtain abrasion resistant surfaces, such as, for example, polycarbonate surfaces, investigators have intended to coat very thin coats of organic or silicone resins on the surface of the plastics. The intent was to obtain abrasion resistance without losing the optical properties of the plastic substrate.

Such an organic coating is disclosed in U.S. Pat. No. 4,018,941. Such an organic coating is prepared from polyols and urethanes and is cured via melamine cross-linkers. Although some degree of abrasion resistance is afforded by the melamine coating, it has a tendency to be affected by outdoor exposure and eventually the coating deteriorates.

In view of the above, silicone coatings which have a tendency to be very weather resistant were developed. Such resins are shown in U.S. Pat. Nos. 3,389,114, 3,389,121, 3,634,321, 3,642,698 and 3,935,346, all assigned to Owens-Illinois. The latter patent teaches a method of making an abrasion resistant coating from an alkylated melamine-formaldehyde resin and a hydrolyzate of $MeSi(OR)_3$. These resins all have good weather resistance but rather moderate abrasion resistance.

There was developed later on a siloxane resin having a low degree of organic substitution. The coating had hardness and therefore good abrasion resistance. Such resins are disclosed in U.S. Pat. No. 3,986,997 issued Oct. 19, 1976 to Harold A. Clark and assigned to the Dow Corning Corporation. The Clark resins are very versatile materials and find utility as abrasion resistant coatings on a number of substrates which require good abrasion resistance.

The only disadvantage of the Clark resins is the fact that they tend to be inflexible, that is, under certain circumstances the coatings tend to craze.

It is well known in the silicone art that flexibility can be built into a siloxane resin coating by merely incorporating a dimethyl containing hydrolyzable silane in the formulation when the resin is first prepared (see Canadian Pat. No. 1,015,888). Unfortunately, the presence of dimethyl siloxane in any siloxane resin tends to also soften the coating so that the abrasion resistance falls off. Thus, for purposes of obtaining an abrasion resistant coating with flexibility, one would not suggest using the above approach in preparing the resins.

What is needed is a weather resistant, abrasion resistant, flexible, clear coating.

THE INVENTION

There has now been discovered a means of improving the flexibility of siloxane resins having a low degree of organic substitution without sacrificing a great deal of the abrasion resistance of the coating.

What is disclosed herein is an improvement in the flexibility of the Clark resins shown in the U.S. Pat. No. 3,986,997 set out above.

Such improved flexibility can be obtained by incorporating in the original formulation for the Clark resin a certain amount of monophenylsilsesquioxane structure.

It has been found that the incorporation of $\phi Si(OH)_3$ in the Clark resin gives increased flexibility to the resin without significant loss of abrasion resistance of the cured coating.

Not only can one obtain flexibility in siloxane resins having a low degree of substitution, one can obtain control over the degree of flexibility given to such resins by merely controlling the amount of monophenyl put into the formulation i.e. the degree of flexibility built into the cured coating of the resin is linearly dependent on the amount of monophenyl actually incorporated in the formulation. The control is such that flexibility $\pm 5\%$ can be estimated from the amount of monophenyl incorporation.

Thus, this invention consists of a pigment-free aqueous coating composition comprising a dispersion of colloidal silica in lower aliphatic alcohol-water or an ether ester of ethylene or propylene glycol-water solution, of the partial condensate of a silanol of the formula $RSi(OH)_3$ in which R is selected from the group consisting of alkyl radicals of 1 to 3 inclusive carbon atoms and phenyl, at least 70 weight percent of the silanol being $CH_3Si(OH)_3$, at least 1 weight percent of the silanol being $\phi Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 2.8 to 6.0.

At least 1 weight percent of $\phi Si(OH)_3$, based on the weight of total $RSi(OH)_3$ present in the composition, is required to get the flexibility effect. Up to 30 weight percent of $\phi Si(OH)_3$ can be utilized. Generally, greater than 30 weight percent, even though giving increased flexibility, does not retain the required abrasion resistance.

The resins are prepared by the methods found in the above Clark patent and the only difference is that $\phi Si(OMe)_3$, in the proper proportions, is mixed with the $CH_3Si(OH)_3$ before the hydrolysis and contact with the colloidal silica. The $\phi Si(OMe)_3$ can be pre-hydrolyzed before mixing with the $CH_3Si(OH)_3$ but no significant advantage is obtained thereby.

The silica component of the composition is present as colloidal silica. Aqueous colloidal silica dispersions generally have a particle size in the range of 5 to 150 millimicrons in diameter. These silica dispersions are prepared by methods well-known in the art and are commercially available under such registered trademarks as "Ludox" and "Nalcoag". It is preferred to use colloidal silica of 10–30 millimicron particle size in order to obtain dispersions having a greater stability and to provide coatings having superior optical properties. Colloidal silicas of this type are relatively free of $Na_2O$ and other alkali metal oxides, generally containing less than 2 weight percent, preferably less than 1 weight percent $Na_2O$. They are available as both acidic and basic hydrosols. Colloidal silica is distinguished from other water dispersable forms of $SiO_2$, such as nonparticulate polysilicic acid or alkali metal silicate solutions, which are not operative in the practice of the present invention.

The silica is dispersed in a solution of the siloxanol carried in a lower aliphatic alcohol-water, or ether ester-water, cosolvent. Suitable lower aliphatic alcohols include methanol, ethanol, isopropanol, and t-butyl alcohol. Mixtures of such alcohols can be used. Isopropanol is the preferred alcohol and when mixtures of alcohol are utilized it is preferred to utilize at least 50 weight percent of isopropanol in the mixture to obtain optimum adhesion of the coating. Suitable ether esters are ether esters of ethylene or propylene glycol such as $CH_3COO(CH_2CH_2O)_2C_2H_5$, $CH_3COO(CH_2CH_2O)_2C_4H_9$, $CH_3COOCH_2CH_2OC_2H_5$, $CH_3COOCH_2CH_2OCH_3$ and $CH_3COOCH_2CH_2OC_4H_9$ and analogs of such materials prepared from propylene glycol. The solvent system should contain from about 20 to 75 weight percent of alcohol or ether ester to ensure solubility of the siloxanol. Optionally one can utilize an additional water-miscible polar solvent, such as acetone, butyl cellosolve and the like in a minor amount, for example, no more than 20 weight percent of the cosolvent system.

To obtain optimum properties in the coating and to prevent immediate gellation of the coating composition, sufficient acid to provide a pH of from 2.8 to 5.2 must be present. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. The stronger acids, such as hydrochloric and toluenesulfonic acid, give appreciably shortened shelf or bath life and require less ageing to obtain the described soluble partial condensate. It is preferred to add sufficient water-miscible carboxylic acid selected from the group consisting of acetic, formic, propionic and maleic acids to provide pH in the range of 4 to 5.5 in the coating composition. In addition to providing good bath life, the alkali metal salts of these acids are soluble, thus allowing the use of these acids with silicas containing a substantial (greater than 0.2% $Na_2O$) amount of alkali metal or metal oxide.

The composition is easily prepared by adding the trialkoxysilanes, such as $R'Si(OCH_3)_3$, to colloidal silica hydrosols and adjusting the pH to the desired level by addition of the organic acid. The acid can be added to either the silanes or the hydrosol prior to mixing the two components provided that the mixing is done rapidly. The amount of acid necessary to obtain the desired pH will depend on the alkali metal content of the silica but is usually less than one weight percent of the composition. Alcohol is generated by hydrolysis of the alkoxy substituents of the silane, for example, hydrolysis of one mole of $-Si(OC_2H_5)_3$ generates 3 moles of ethanol. Depending upon the percent solids desired in the final composition, additional alcohol ether ester, water or a water-miscible solvent can be added. The composition should be well mixed and allowed to age for a short period of time to ensure formation of the partial condensate. The coating composition thus obtained is a clear or slightly hazy low viscosity fluid which is stable for several days.

Buffered latent condensation catalysts can be added to the composition so that milder curing conditions can be utilized to obtain the optimum abrasion resistance in the final coating. Alkali metal salts of carboxylic acids, such as potassium formate, are one class of such latent catalysts. The amine carboxylates and quaternary ammonium carboxylates are another such class of latent catalysts. Of course the catalysts must be soluble or at least miscible in the cosolvent system. The catalysts are latent to the extent that at room temperature they do not appreciably shorten the bath life of the composition, but upon heating the catalyst dissociates and generates a catalytic species active to promote condensation. Buffered catalysts are used to avoid effects on the pH of the composition. Certain of the commercially available colloidal silica dispersions contain free alkali metal base which reacts with the organic acid during the adjustment of pH to generate the carboxylate catalysts in situ. This is particularly true when starting with a hydrosol having a pH of 8 or 9. The compositions can be catalyzed by addition of carboxylates such as dimethylamine acetate, ethanolamine acetate, dimethylaniline formate, tetraethylammonium benzoate, sodium acetate, sodium propionate, sodium formate or benzyltrimethylammonium acetate. The amount of catalyst can be varied depending upon the desired curing condition, but at about 1.5 weight percent catalyst in the composition, the bath life is shortened and optical properties of the coating may be impaired. It is preferred to utilize from about 0.05 to 1 weight percent of the catalyst.

To provide the greatest stability in the dispersion form while obtaining optimum properties in the cured coating, it is preferred to utilize a coating composition having a pH in the range of 4–5 which contains 10–35 weight percent solids; the silica portion having a particle size in the range of 5–30 millimicrons, the partial condensate $CH_3Si(OH)_3$ and $\phi Si(OH)_3$ being present in an amount in the range of 35 to 55 weight percent of the total solids in a cosolvent of methanol, isopropanol and water or $CH_3COOCH_2CH_2OCH_3$ and water or ether esters, the alcohols representing from 30 to 60 weight percent of the cosolvent and a catalyst selected from the group consisting of sodium acetate and benzyltrimethylammonium acetate being present in an amount in the range of 0.05 to 0.5 weight percent of the composition. Such a composition is relatively stable and, when coated onto a substrate, can be cured in a relatively short time at temperatures in the range of 75°–125° C. to provide a transparent abrasion resistant surface coating.

The coating compositions of the invention can be applied to solid substrates by conventional methods, such as flowing, spraying or dipping to form a continuous surface film. Although substrates of soft plastic sheet material show the greatest improvement upon application of the coating, the composition can be applied to other substrates, such as wood, metal, printed surfaces, leather, glass, ceramics and textiles. The compositions are especially useful as coatings for dimensionally stable synthetic organic polymeric substrates in sheet or film form, such as acrylic polymers, for example, poly(methylmethacrylate), polyesters, for example poly(ethyleneterephthalate) and polycarbonates, such as poly(diphenylolpropane)carbonate, polyamides, polyimides, copolymers of acrylonitrile-styrene, styrene-acrylonitrilebutadiene copolymers, polyvinyl chloride, butyrates, polyethylene and the like. Transparent polymeric materials coated with these compositions are useful as flat or curved enclosures, such as windows, skylights and windshields, especially for transportation equipment. Plastic lenses, such as acrylic or polycarbonate ophthalmic lenses, can be coated with the compositions of the invention. In certain applications requiring high optical resolution, it may be desirable to filter the coating composition prior to applying it to the substrate. In other applications, such as corrosion-resistant coatings on metals, the slight haziness (less than 50%) obtained by the use of certain formulations, such as those containing citric acid and sodium citrate, is not detrimental and filtration is not necessary.

By choice of proper formulation, including solvent, application conditions and pretreatment of the substrate, the coatings can be adhered to substantially all solid surfaces. A hard solvent-resistant surface coating is obtained by removal of the solvent and volatile materials. The composition will air dry to a tack-free condition, but heating in the range of 50° to 150° C. is necessary to obtain condensation of residual silanols in the partial condensate. This final cure results in the formation of silsesquioxanes of the formula $\phi SiO_{3/2}$ and $RSiO_{3/2}$ and greatly enhances the abrasion resistance of the coating. The coating thickness can be varied by means of the particular application technique, but coatings of about 0.5 to 20 micron preferably 2–10 micron thickness are generally utilized. Especially thin coatings can be obtained by spin coating.

Now so that those skilled in the art can better understand and appreciate the invention, the following examples are presented.

In the examples and elsewhere in this disclosure, the use of the symbols $\phi$ and Me mean "phenyl" and "methyl" respectively.

EXAMPLE 1

Preparation of phenyl containing resins of this invention.

Six resins were prepared for evaluation.

Sample 1 was prepared according to the procedure of Example 1 of U.S. Pat. No. 3,986,997 and was used for comparison purposes.

Samples 2–6 were prepared according to the following procedure. Samples 2, 3 and 4 fall within the scope of this invention and Samples 5 and 6 fall outside the scope of the claims.

5%$\phi$Si(OH)$_3$/45CH$_3$Si(OH)$_3$

To a three-necked, round-bottomed flask was added 154.5 grams of a colloidal silica having an initial pH of 3.1 containing 34% SiO$_2$ of approximately 22 millimicron particle size and having an Na$_2$O content of less than 0.01 weight percent. It was cooled to 8° C. and 5.3 grams of glacial acetic acid was added. 96.0 grams of CH$_3$Si(OMe)$_3$ and 8.1 grams of $\phi$Si(OMe)$_3$ were premixed and slowly added to the colloidal silica with vigorous stirring and external cooling. The methoxy silanes were allowed to hydrolyze with the formation of methanol. After the hydrolysis was complete, 2.7 grams of a 10% solution of sodium acetate and 132.4 grams of isopropanol were added. After seven days standing, 66.2 grams additional alcohol was added and the solution filtered.

EXAMPLE 2

Plexiglas ® panels 4"×4"×⅛" (10.6 cm×10.16 cm×0.32 cm) after being cleaned with isopropanol and air dried, were flow coated with a 22.5% solids resin, allowed to air dry and then cured for 18 hours at 75° C.

Similar 1"×4"×⅛ (2.54 cm×10.16 cm×0.32 cm) strips were prepared to test the flexibility. The test for flexibility is relative and was carried out in the following manner.

The 1" (2.54 cm) wide strips were placed in a vise-like device so that the longest i.e. 4" (10.16 cm) axis was horizontal. A strong light was placed on the opposite side of the strip from where the observation was being made, so that the craze marks when they formed, were more easily seen. The vise-like device is manipulated by hand to draw the vise jaws together slowly so that the plastic strip first humps in the center and then begins to form a semi-circle with the coating on the outside of the semi-circle. While observing the coating, the jaws are moved slowly together (decreasing the radius of curvature) until craze marks are propogated in the coating. When the craze marks show across the entire width of the plastic strip, the end point has been reached.

The degree of flexibility is then calculated in the following manner. The initial length of the strip before compression is designated $\widehat{AB}$. The distance between the vise jaws at the end of compression is designated $\overline{AB}$. Prior measurements of angle of $\theta$ plotted versus $$\frac{\overline{AB}}{\widehat{AB}}$$

give a graph $$\text{i.e. } \theta = \frac{\overline{AB}}{\widehat{AB}}$$

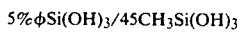

from which $\theta$ can be easily determined.

The radius of curvature (r) can then be calculated.

$$r = \frac{\widehat{AB} \cdot 180°}{\pi \theta°}.$$

One has to assume that $\widehat{AB}$ is an arc of a circle. The actual shape of the semi-circle in this test is a parabola which suggests that this is a more severe test than a test which had a true semi-circular shape.

The abrasion resistance was determined according to ASTM Method D1044-56. The instrument was the Tabor A braser. A 500 gram test load was used with CS-10F abrasive wheels and the test panels subjected to 500 revolutions on the abraser turntable. The percent change in haze which is the criterion for determining the abrasion resistance of the coating is determined by measuring the difference in haze of the unabrased and abrased coatings. Haze is defined as that percentage of transmitted light which in passing through the specimen deviates from the incident beam by forward scattering. In this method, only light flux that deviates more than 2.5 degrees on the average is considered to be haze. The Δ Haze on the coatings was determined by ASTM Method D1003-61. A Hunter Haze Meter: Gardner Laboratory, Inc. was used. The Δ Haze was calculated by measuring the amount of diffused light dividing by the amount of transmitted light and multiplying by one hundred.

The Results

| Sample No. | Φ wt. % total solids | Partial Condensate Formulation | | Adhesion to Plexiglas | Average of Two results | |
|---|---|---|---|---|---|---|
| | | CH$_3$ | Φ | | radius in cm. | Abrasion Δ Haze |
| 1 | 0 | 100 | 0 | 100% | 10.16 | 2.5% |
| 2 | 5 | 90 | 10 | 100% | 7.87 | 3.7% |
| 3 | 10 | 80 | 20 | 100% | 8.64 | 4.6% |
| 4 | 15 | 70 | 30 | 100% | 8.13 | 5.0% |
| 5 | 20 | 60 | 40 | 100% | 7.62 | 7.9% |
| 6 | 25 | 50 | 50 | 100% | 6.60 | 9.2% |

The adhesion test was the ⅛" crosshatch tape pull test in which the cured coating is crosshatched in ⅛" squares using a sharp object, over a square inch area. Adhesive tape (#600 Adhesive—3M Company) is firmly pressed onto the crosshatched area and sharply pulled away. If all of the coating remains, the adhesion is 100%.

That which is claimed is:

1. An article comprising a solid substrate coated with a pigment-free aqueous coating composition comprising a dispersion of colloidal silica in lower aliphatic alcohol-water or an ether ester of ethylene or propylene glycol-water solution, of the partial condensate of a silanol of the formula RSi(OH)$_3$ in which R is selected from the group consisting of alkyl radicals of 1 to 3 inclusive carbon atoms and phenyl, at least 70 weight percent of the silanol being CH$_3$Si(OH)$_3$, at least 1 weight percent of the silanol being φSi(OH)$_3$, said composition containing 10 to 50 weight percent solids consisting essentially of 10 to 70 weight percent colloidal silica and 30 to 90 weight percent of the partial condensate, said composition containing sufficient acid to provide a pH in the range of 2.8 to 6.0.

2. An article in accordance with claim 1 where in the coating composition, the acid is a water-miscible organic acid selected from the group consisting of acetic, formic, propanoic and maleic acid.

3. An article in accordance with claim 2 wherein the coating composition contains from about 0.05 to 1.5 weight percent of a buffered latent silanol condensation catalyst.

4. An article in accordance with claim 3 wherein said solid substrate is transparent.

5. An article in accordance with claim 4 wherein said solid substrate is acrylic polymer.

6. An article in accordance with claim 4 wherein said solid substrate is polyester.

7. An article in accordance with claim 6 wherein the polyester is poly(diphenylol propane) carbonate.

8. An article in accordance with claim 6 wherein the polyester is poly(diethylene glycol bis allyl) carbonate.

9. An article in accordance with claim 4 in the form of a lens.

10. An article in accordance with claim 8 wherein the lens is an ophthalmic lens.

11. An article in accordance with claim 1 wherein the substrate is a metal substrate.

12. An article as claimed in claim 11 wherein the metal substrate is selected from a group consisting of silver, copper, aluminum, titanium and stainless steel.

* * * * *

UNITED STATES PATENT AND TRADEMARK OFFICE
CERTIFICATE OF CORRECTION

PATENT NO. : 4,243,721
DATED : January 6, 1981
INVENTOR(S) : Ronald H. Baney; Len A. Harris It is certified that error appears in the above-identified patent and that said Letters Patent are hereby corrected as shown below:

In Column 4, line 48; the line reading "esters, the alcohols representing from 30 to 60weight" should read "esters, the alcohols representing from 30 to 60 weight".

In Column 5, line 16; the number "50%" should read "5%".

In Column 6, line 9; the line reading "Similar 1"X4"X1/8 (2.54 cmX10.16 cmX0.32 cm)" should read "Similar 1"X4"X1/8" (2.54 cmX10.16 cmX0.32 cm)".

Signed and Sealed this

Fifteenth Day of September 1981

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,243,721

DATED : January 6, 1981

INVENTOR(S) : Ronald H. Baney et al.

It is certified that error appears in the above-identified patent and that said Letters Patent is hereby corrected as shown below:

The term of this patent subsequent to Sept. 16, 1997 has been disclaimed.

Signed and Sealed this

Twenty-sixth Day of November 1985

[SEAL]

Attest:

DONALD J. QUIGG

Attesting Officer    Commissioner of Patents and Trademarks